United States Patent [19]

Qurnell et al.

[11] 4,420,455
[45] Dec. 13, 1983

[54] END PLUG GAUGING DEVICE AND METHOD

[75] Inventors: Frank D. Qurnell; Nordahl H. Skarshaug, both of San Jose, Calif.

[73] Assignee: General Electric Company, San Jose, Calif.

[21] Appl. No.: 233,841

[22] Filed: Feb. 12, 1981

[51] Int. Cl.³ .......................... G21C 17/00; G01B 5/14
[52] U.S. Cl. ................................. 376/245; 33/169 R; 33/169 B; 376/258
[58] Field of Search ....................... 376/245, 257, 258; 33/169 R, 169 B

[56] References Cited

U.S. PATENT DOCUMENTS

| | | | |
|---|---|---|---|
| 3,936,945 | 2/1976 | Jevremov | 33/169 B X |
| 3,967,382 | 7/1976 | Johnson et al. | 376/245 X |
| 4,251,922 | 2/1981 | Perlotto | 33/169 R |
| 4,314,406 | 2/1982 | Barnes | 33/169 B |
| 4,336,103 | 6/1982 | Kätscher | 376/245 |

Primary Examiner—Richard A. Farley
Attorney, Agent, or Firm—Ivor J. James, Jr.; Samuel E. Turner; Raymond G. Simkins

[57] ABSTRACT

An amphibious end plug gauging device and method for determining the axial location of nuclear fuel element end plugs within or without the upper tie plate of a fuel bundle. The gauging device is maneuvered toward an underwater fuel bundle in a reactor service pool and its tip inserted in a preselected tie plate shank hole to engage the end of a fuel element in the bundle. The position of the fuel element relative the upper surface of the tie plate is registered on a dial indicator.

13 Claims, 5 Drawing Figures

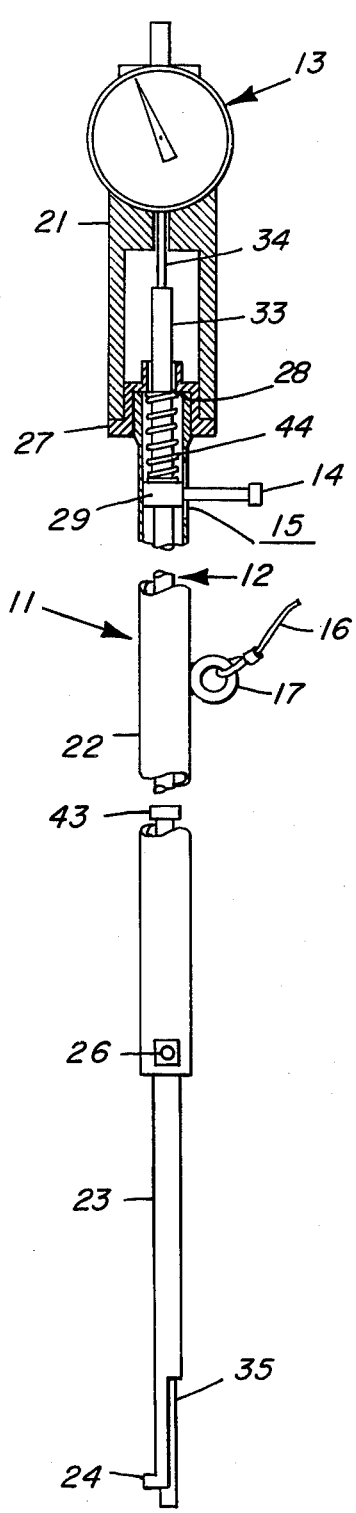
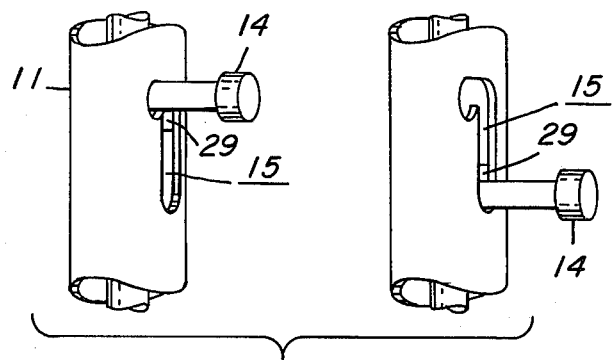
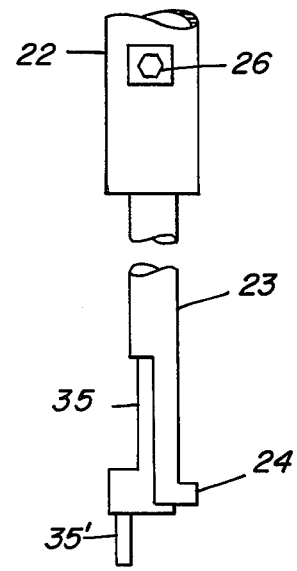
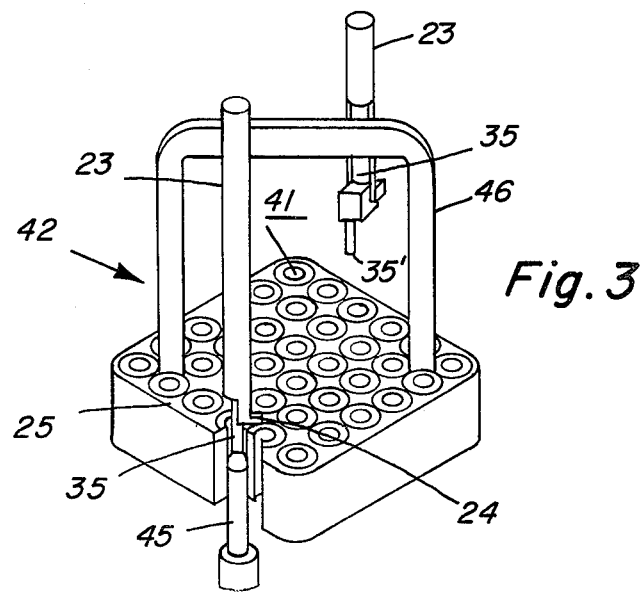
Fig. 1
Fig. 1A
Fig. 2
Fig. 3

END PLUG GAUGING DEVICE AND METHOD

BACKGROUND OF THE INVENTION

This invention relates to an amphibious device for monitoring nuclear fuel element growth as a consequence of irradiation and more particularly deals with an amphibious end plug gauging device for subaqueously measuring the distance between fuel element end plugs and the upper tie plate surface of a fuel bundle comprising the fuel elements.

Fuel bundles in a reactor core include a plurality of fuel elements vertically positioned between upper and lower tie plates, and horizontally secured by spacers positioned at predetermined intervals between the tie plates. When the bundles are removed from the core after reactor operation, they are "hot" or irradiated and are typically stored underwater in a reactor service pool for radiation shielding. The fuel elements between the tie plates are individually capped at each end, to prevent the escape of fission products and fission gas. This is accomplished by welding so called "end plugs" including cylindrical shanks onto the ends of the elements. Some of the shanks are threaded, permitting the corresponding fuel elements to be screwed into place or held down by nuts on the shank. In most instances, however, the shanks are smooth and the fuel elements are merely inserted into place by fitting the shanks into receiving shank holes drilled through the tie plates. Each fuel element is provided with a downwardly biasing spring bearing against the underside of the upper tie plate and concentrically mounted about the shank of the upper end plug.

During reactor operation, radiation causes the fuel elements between the upper and lower tie plates to grow at varying rates. The elements secured onto the tie plates may grow more slowly or more rapidly than those merely inserted into shank holes of the tie plates—possibly causing separation between the upper tie plate and a number of the fuel elements, or conversely possibly causing certain fuel elements to bow laterally due to insufficient room for axial expansion. In either case, whether separated from the upper tie plate and thereby subject to vibration caused by reactor water being circulated through the fuel bundle, or bowed by excessive growth, detrimental stresses are imposed on the cladding of the fuel elements, possibly causing the cladding to rupture.

Further information on the structure of fuel elements and fuel bundles is found in U.S. Pat. No. 3,431,170, which is expressly incorporated into this disclosure and made a part thereof.

To minimize the aforementioned risks of separation and bowing of fuel elements within a bundle, regular monitoring of fuel element growth is desirable. This can be accomplished by regularly measuring the distance between end plugs and a reference or datum surface of the upper tie plate in accordance with the invention disclosed herein.

Accordingly, an object of this invention is to promote the integrity of nuclear fuel bundles, and more particularly to maintain fuel elements suitably positioned or secured within the upper tie plate of a fuel bundle.

Another object of the present invention is to provide an amphibious device capable of measuring fuel rod growth relative to an upper tie plate reference surface in a manner obviating disassembly of the fuel bundle prior to measurement.

Another object of the present invention is to promote the convenient and economical subaqueous measurement of the degree of insertion of reactor fuel elements in an upper tie plate intended for holding the upper ends of the fuel elements in a spaced relationship to one another.

SUMMARY OF THE INVENTION

The present invention according to one embodiment thereof relates to a tubular, amphibious end plug gauging device for subaqueously measuring the irradiation growth of fuel elements by an operator separated from the fuel element by the shielding water of a reactor service pool. The device measures the distance between the upper or reference surface of the upper tie plate of a fuel bundle and the end plugs of reactor fuel elements by inserting a measuring tip of the gauging device into selected shank holes of the upper tie plate. To conduct a measurement, the outer tube of the device is held against the upper tie plate for reference, and the inner rod assembly of the device actuates a plunger when the tip of the gauging device makes contact with the shank of the end plug. During underwater maneuvering toward the fuel bundle to be measured, the rod assembly of the device is latched into a withdrawn, protected position within the outer tube. This is accomplished by cocking a bolt in the outer tube, by pulling it along the longitudinal portion of an L-shaped slot in the tubes and latching it sidewards at the end of its longitudinal run. During measurement, the bolt is unlatched.

BRIEF DESCRIPTION OF THE DRAWING

FIG. 1 is a diagram of the amphibious end plug gauging device;

FIG. 1A illustrates the L-shaped slot in the device with the bolt alternately in cocked position or operational;

FIG. 2 shows an illustration of an auxiliary end plug gauging device with the tip set-off from the main axis of the device, whereby measurement can be made below the upper tie plate bale;

FIG. 3 illustrates two modes of positioning the end plug gauging device on the upper tie plate of the fuel assembly;

DESCRIPTION OF THE PREFERRED EMBODIMENT

Figure 4:
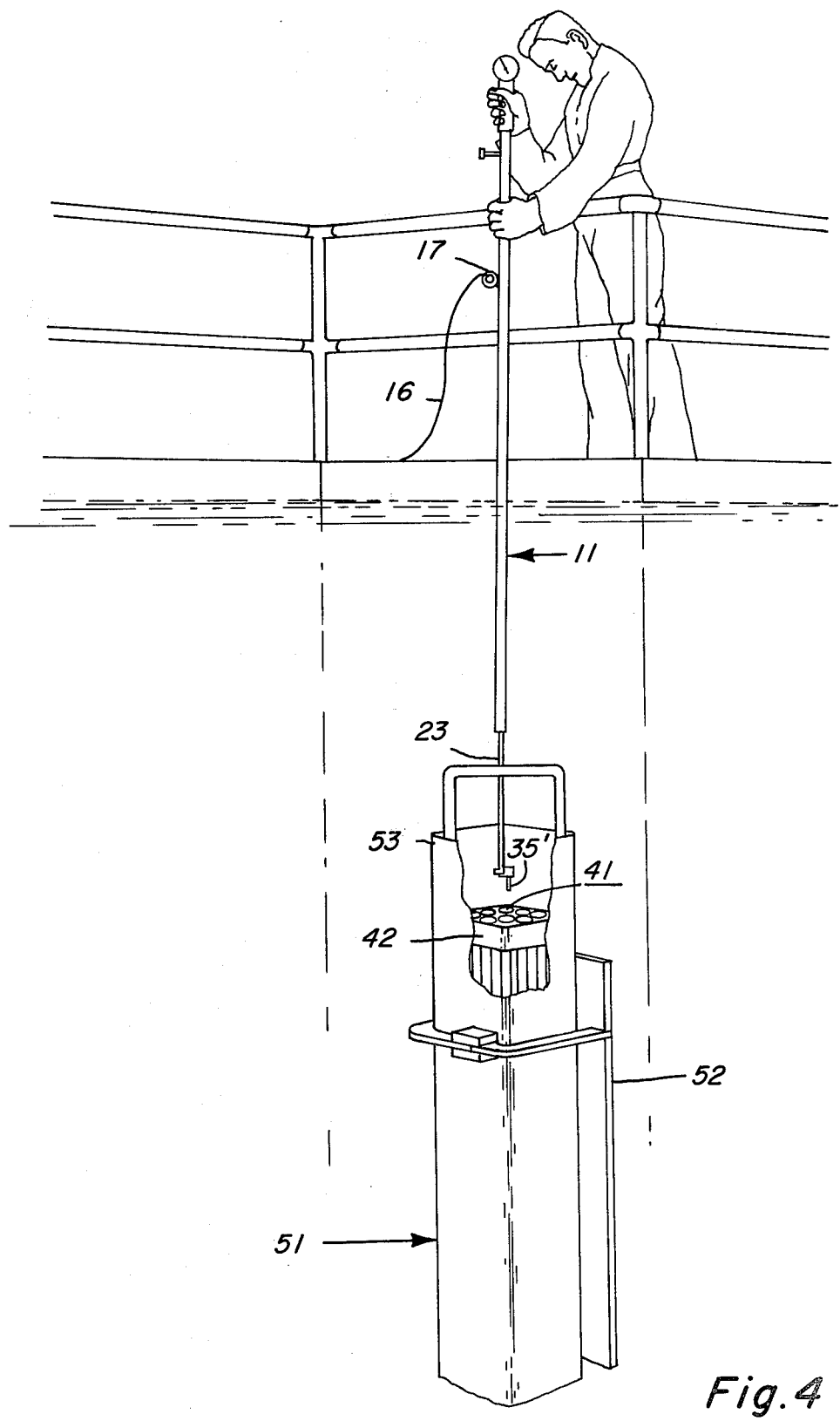
FIG. 4 shows an operator positioning the end plug gauging device over the upper tie plate of a fuel bundle mounted underwater in a fixture within the reactor service pool.

The end plug gauging device described herein and shown in FIG. 1 includes an outer tube assembly 11, an inner rod assembly 12, and a position indicator 13 mounted on the outer tube assembly 11. A latch or bolt 14 is secured to the rod assembly 12 and protrudes through an L-shaped slot 15 in the tube assembly 11. A lanyard 16 passes through a holding piece or ring 17 on the tube.

FIG. 1 additionally shows the tube assembly 11 including an upper tube 21 for mounting the position indicator 13, a middle or handling tube 22 for convenient manipulation, and a lower tube 23 including a sideward extension or foot 24, which rests on the upper or datum surface 25 of the upper tie plate during measurement (see FIG. 3). The tube assembly 11 need not be segmented, but ease of assembly and storage makes this convenient. Additionally, constructing the gauging device in parts enables the lower tube 23 to be constructed of a sturdy material such as stainless steel, while the upper and middle tubes 21, 22 are made of aluminum. This reduces the overall weight of the device, which is about 12 to 15 feet in length, according to this embodiment.

As shown, the lower tube 23 is the smallest in diameter and its end snugly fits within the end of the middle or handling tube 22. It is secured to the handling tube 22 by a set screw 26, but other suitably means may be substituted. The middle tube 22, in turn, is inserted into the upper tube 21 by an intervening neck fixture 27 including an inner flange 28, as will be discussed hereinafter.

The handling tube 22 defines the contour of the slotted, L-shaped aperture 15 through which passes the bolt 14 affixed to a collar 29 on the rod assembly 12 as will also be discussed hereinafter.

The tube assembly 11 may accordingly be said to include a fixed sequence of progressively smaller diameter tubes. This is a convenient arrangement in which the upper tube 21 is relatively short and serves primarily to mount the position indicator 13 and to provide a transition piece to the main portion of the tube assembly: the handling tube 22. The smallest diameter piece—but perhaps the hardiest—is the lower tube 23, which is most likely to be buffeted and subject to minor collisions during measurement.

The rod assembly 12 fits concentrically within the tube assembly 11. One end 33 thereof cooperatively abuts a position sensitive plunger 34 of the position indicator 13. The other end or tip 35 extends below the foot 24 of the lower tube 23 for insertion into shank holes 41 drilled into an upper tie plate 42 for measurement, as shown in FIG. 3. The rod assembly 12 is formed of rod segments suitably held together by connectors 43. The collar 29 is suitably fixedly mounted about a portion of the rod assembly 12 adjacent the L-shaped slot 15 of the handling tube 22. The bolt 14 is radially mounted on collar 29 and extends through the L-shaped slot 15, permitting cocking or latching of the rod assembly 12 into a withdrawn position within the tube assembly 11.

Normally, the tip of the rod assembly 12 extends out of the tube assembly 11 to make selected measurements on the upper tie plate. The bolt 14 prevents the rod assembly 12 from sliding out of the tube assembly 11. The collar 29 conveniently mounts the bolt 14 on the rod assembly 12 and provides a bulkhead against which a spring 44 can bear.

The spring 44 is mounted between the collar 29 of the rod assembly 12 and the flange 28 of the neck fixture 27 discussed above. The spring 44 downwardly biases the rod assembly 12 and pushes the tip 35 of the rod assembly outside the protection of the lower tube 23 in order to effect fuel rod growth measurements.

The L-shaped slot 15 through which the bolt 14 passes, extends longitudinally down the surface of the handling tube 22 for an appreciable distance and circumferentially around a portion of the handling tube 22 sufficiently for an operator to withdraw the tip 35 of the rod assembly 12 into the protection of the lower tube 23 and to latch it into place. Additionally, the slot 15 is long enough to permit the device to measure end plugs 45 within and without the upper tie plate 42.

By suitably manipulating the bolt 14 of the device, an operator can counteract the bias of the spring 44 and securely lock the rod assembly 12 within the tube assembly 11, as shown in FIG. 1A.

The lanyard 16 is secured by the ring or similar means 17 suitably connected to the handling tube 22 in order to prevent the device from accidentally falling into the reactor service pool during measurement.

The tie plate 42, as seen in FIG. 3, includes a diagonal bale or handle 46 which prevents the direct vertical measurement of those fuel elements below the handle 46. Accordingly, an auxiliary tip 35' is provided for suitable mounting on the lower end of the rod assembly 12. This tip 35' laterally displaces the actual tip 35 from its original axis sufficiently to permit measurement of shank holes below the diagonal handle 46 of the tie plate 42. The lower tube 23 is suitably modified in order to receive an auxiliary tip 35', as shown in FIG. 2. More specifically, a section of the tube assembly 11 is cut away to provide clearance for mounting the auxiliary tip 35' on the end of the rod assembly 12.

The position indicator 13 utilized in this version of the invention is a conventional dial position indicator able to convert displacement of a plunger in its body into a proportional numerical value on its dial face. One example of a suitable dial indicator is model #8341-941 by Brown & Sharp.

The end plug gauging device disclosed herein may be calibrated in a number of ways, depending upon the desired zero indication. One way to calibrate the device is to hold its end against a flat surface, whereby the tip 35 of the rod assembly 12 and the foot 24 of the tube assembly 11 both bear against the flat surface. Then a calibration screw (not shown) is turned to a preselected numerical value. This number may be zero, but any other number can suitably be employed as well.

Fuel element measurements are conducted near the side of the reactor service pool as shown in FIG. 4, with a fuel bundle 51 held in place by a suitable underwater fixture 52. The top 53 of the bundle remains at least six feet below the water surface at all times during measurement, in order to provide adequate radiation protection for the measuring engineer or other operator. The measurements conducted are of "hot" fuel bundles that have been active in the reactor core during power production. Accordingly, the water protects the operator from undue radiation exposure. The measurement device is lowered into the water during operation and is positioned over a selected hole 41 in tie plate 42 corresponding to the fuel element to be measured.

The device is then inserted into the selected hole 41 until the tip 35 abuts the top of the end plug 45 (FIG. 3) and the foot 24 of the tube reaches the reference surface 25. The measuring operator can then record the dial indication, continuing onto other holes 41 until the axial position of all selected fuel elements has been recorded.

After reference to the foregoing, modifications of this invention may occur to those skilled in the art. However, it is to be understood that this invention is not intended to be limited to the particular embodiment shown and described herein, but is intended to cover all modifications coming within the spirit and scope of the invention as claimed.

What is claimed is:

1. An end plug gauging device for use in determining the axial position of nuclear fuel elements in the upper tie plate of a reactor fuel bundle submerged in a pool of water, comprising mounting means for mounting a position indicator including a plunger for actuating said indicator in proportion to the degree of depression of the plunger, said mounting means including a lower end for placement on a reference plane defined by the submerged upper surface of said upper tie plate, and means slidably, coaxially mounted within said mounting means, said means slidably mounted being in cooperation with said plunger and acting as an extension of said plunger, and including a tip extendable below said lower end of said mounting means to engage the end of the shank of an end plug of a fuel rod in said upper tie plate.

2. The device of claim 1, including biasing means for downwardly biasing said means slidably mounted.

3. The device of claim 2, wherein said downward bias is provided by a spring means bearing against a portion of said mounting means.

4. The device of claim 1, wherein said mounting means is tubular and includes a handling tube.

5. The device of claim 1, wherein the position indicator mounting means includes a means mounted thereon for receiving a lanyard for mechanically securing the position of said end plug gauging device proximate to measuring operation.

6. The device of claim 1, wherein said mounting means defines a slot for receiving a bolt therethrough for permitting the manipulation of said means slidably mounted during measurement operation.

7. An end plug gauging device for determining the axial position of nuclear fuel elements in a fuel bundle submerged in a pool of water, comprising tubular means including a foot for placement on a reference plane defined by the upper surface of the tie plate of a bundle to be measured, displacement gauge means including a plunger, said gauge means being mounted on said tubular means, rod means concentrically, slidably mounted within said plunger, said rod means including a tip externally extendable from said tubular means for insertion into shank holes in the upper tie plate of a fuel bundle.

8. The device of claim 7, wherein the rod means includes a bolt extending radially therefrom, whereby the outward extension of said rod means from said tube means in manually controllable.

9. The device of claim 7, wherein said foot is a radially extending protrusion at the lower portion of said tube means.

10. The device of claim 7, wherein the tube means is constructed in sections, whereby storage and assembly is facilitated.

11. The device of claim 7, wherein said displacement gauge is a dial indicator.

12. The device of claim 7, further comprising a ring externally mounted on said tube means for passing a lanyard therethrough, whereby the device is securable from dropping into the reactor service pool in the course of operation.

13. The method of measuring the degree of displacement of fuel elements in a nuclear fuel bundle relative to a reference plane defined by the upper surface of the upper tie plate of the fuel bundle, including the steps of placing the lower end of a tubular member including a plunger-actuated displacement indicator near the edge of a selected shank hole in the upper tie plate, which holds the fuel rods in the bundle in position; releasing a rod member, which is concentrically disposed within said tubular member and cooperatively engages said plunger-actuated displacement indicator, until the tip of said rod member comes in contact with the upper end of the fuel element held in the selected shank hole; and recording a reading established by said displacement indicator for reference in fuel element growth evaluation, whereby the risk of disengagement or bowing of fuel elements secured or positioned in the upper tie plate can readily be ascertained.

* * * * *